United States Patent
Kanazawa et al.

(10) Patent No.: US 8,151,367 B2
(45) Date of Patent: Apr. 3, 2012

(54) INFORMATION PROCESSING SYSTEM

(75) Inventors: Yuzi Kanazawa, Kawasaki (JP); Yoshihiro Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1181 days.

(21) Appl. No.: 11/134,326

(22) Filed: May 23, 2005

(65) Prior Publication Data

US 2005/0209969 A1    Sep. 22, 2005

Related U.S. Application Data

(63) Continuation of application No. PCT/JP03/06358, filed on May 21, 2003.

(51) Int. Cl.
*G06F 21/00* (2006.01)

(52) U.S. Cl. ............... 726/34; 726/35; 713/193

(58) Field of Classification Search ............ 726/34, 726/35, 27; 713/18, 4, 185, 193, 194, 184; 380/247, 249; 455/411, 410
See application file for complete search history.

(56) References Cited

U.S. PATENT DOCUMENTS

| | | | |
|---|---|---|---|
| 6,594,765 B2 * | 7/2003 | Sherman et al. | 726/35 |
| 6,643,781 B1 * | 11/2003 | Merriam | 726/35 |
| 6,725,379 B1 * | 4/2004 | Dailey | 726/35 |
| 6,950,946 B1 * | 9/2005 | Droz et al. | 726/35 |
| 7,266,849 B1 * | 9/2007 | Gregory et al. | 726/34 |
| 7,460,853 B2 * | 12/2008 | Toyoshima | 455/410 |
| 2002/0194499 A1 * | 12/2002 | Audebert et al. | 713/201 |

FOREIGN PATENT DOCUMENTS

| | | |
|---|---|---|
| JP | 8-251660 | 9/1996 |
| JP | 10-154977 | 6/1998 |
| JP | 2000-138674 | 5/2000 |
| JP | 2001-346257 | 12/2001 |
| JP | 2002-529032 A | 9/2002 |
| JP | 2003-067214 A | 3/2003 |

OTHER PUBLICATIONS

Japanese Office Action dated May 20, 2008, issued in corresponding Japanese Application No. 2004/572104.

* cited by examiner

*Primary Examiner* — Edward Zee
(74) *Attorney, Agent, or Firm* — Fujitsu Patent Center

(57) ABSTRACT

An information processing system includes a management apparatus having a transmission preventing part preventing transmission of a predetermined usage allowing signal allowing usage of a predetermined device, in response to receiving a predetermined usage preventing instruction for the predetermined device.

6 Claims, 5 Drawing Sheets

INFORMATION PROCESSING SYSTEM

CROSS-REFERENCE TO RELATED APPLICATION

This application is a U.S. continuation application filed under 35 USC 111(a) claiming benefit under 35 USC 120 and 365(c) of PCT application JP03/06358, filed May 21, 2003. The foregoing application is hereby incorporated herein by reference.

BACKGROUND OF THE INVENTION

1. Field of the Invention

The present invention relates to an information processing system, an information processing method and an information processing apparatus, and, in particular, to an information processing system, an information processing method and an information processing apparatus in which usage of a predetermined device is prevented according to an intention of a true owner of the predetermined device.

2. Description of the Related Art

A device which is used in a condition where the device is loaded in a computer, for example, an information recording disk or such (a hard disk, a flexible disk, a CD, a DVD or such) is used, no particular authentication processing is required in general. However, in such a case, if this device is lost, stolen or so, confidential information written therein, if any, may leak out. As a countermeasure thereto, password authentication may be applied, for example for authenticating a user.

However, a case may be assumed where a person who illegally obtains a device such as the above-mentioned information recording disk, a compact flash or such loads the same in a computer which the person himself or herself has. In such a case, as long as the person has a necessary drive unit such as a computer to drive such a device of the same type, the person can use the relevant device (disk or such) even when the person is not a true owner of the device. Accordingly, the relevant problem cannot be solved merely by means of the above-mentioned password authentication method, which is applied for starting up a drive unit such as a computer.

A conventional example discloses a method in which, with the use of a pass phrase (long password), data is protected in a notebook personal computer (made by IBM, product name: 'Think Pad A31p'). In this method, a user inputs a pass phrase, the contents stored in a disk are encoded therewith, and thus, usage of the same data by another person is prevented. However, in this method, the pass phrase itself may leak out in an environment in which the personal computer is shared by a plurality of persons, and thus, sufficient protection of the data may not be provided.

SUMMARY OF THE INVENTION

As another method to solve the problem, a password authentication or such may be applied for allowing usage of each device itself such as a disk, a compact flash or such storing information. However, assuming that such a method is actually applied, input of the password or such should be required each time when the relevant device is loaded in a drive unit such as a computer and starting up of the device is allowed, for the purpose of ensuring sufficient safety of confidential information stored in the device. Thus, the user should pass through such a troublesome process.

Furthermore, recently, other than a common personal computer, other apparatuses such as a PDA, a cellular phone and so forth have the same functions as those of the computer. The above-mentioned problem may also occur in these apparatuses. That is, when a device such as a memory card is actually used in a condition in which it is loaded in a PDA, a cellular phone or such, a user may also be required to pass through a troublesome process if authentication such as password authentication or such is required each time when actual usage of the device such as a memory card is needed.

The present invention has been devised in consideration of the above-mentioned problem, and an object of the present invention is to provide a system in which security of information can be ensured even for a case where a relevant device storing the information is lost or stolen, without losing a convenience of the device, as an information processing apparatus, such as an information recording disk, a memory card or such.

In order to solve the problem, according to the present invention, a management apparatus is provided which responds to a predetermined usage preventing instruction concerning a predetermined device, and stops transmission of a predetermined usage allowing signal required for allowing usage of the predetermined device. By this configuration, a true owner may give the predetermined usage preventing instruction when he or she has lost the predetermined device or has the same stolen. The management apparatus responds thereto, and thus stops transmission of the usage allowing signal. As a result, the predetermined device cannot receive the usage allowing signal, and thus, usage of the predetermined device is not allowed by a function of the predetermined device itself. Accordingly, even when confidential information is stored in the predetermined device, this information is prevented from leaking out to any third person.

It is noted that, in a case where the above-mentioned configuration is actually applied, the predetermined device should have a configuration such that usage of the predetermined device is allowed only after the predetermined device receives the predetermined usage allowing signal. That is, for example, when the predetermined device is used by a user, that is, when the predetermined device is started up, a predetermined usage request signal should be first transmitted to the management apparatus from the predetermined device. In response thereto, the management apparatus should return the predetermined usage allowing signal unless the predetermined usage preventing instruction is received.

Further, in this case, it is preferable to provide a configuration for preventing the predetermined device from being used illegally with the use of the predetermined usage allowing signal illegally forged by a third person, even though the usage preventing instruction has been issued. For this purpose, for example, it is preferable to provide a configuration such that the predetermined device should confirm that the received usage allowing signal is one positively issued by the management apparatus. That is, it is preferable to provide a configuration for determining the propriety of the received usage allowing signal.

For this purpose, the flowing scheme may be applied. That is, a predetermined usage request signal is generated by the predetermined device, and, in response thereto, the management apparatus first identifies the predetermined device which has generated the usage request signal with the use thereof. Then, according to the identification result, the management apparatus generates the usage allowing signal unique to the predetermined device, and returns the same to the predetermined device. In response thereto, the predetermined device identifies the usage allowing signal unique to itself, and thus, confirms that the thus-received usage allowing signal is one positively transmitted by the predetermined management apparatus. It is noted that the above-mentioned usage allowing signal unique to the predetermined device is one generated with the use of predetermined information which only the predetermined management apparatus has, for example, a 'private key' unique to the relevant predetermined device. Thereby, it is possible to confirm that the usage allowing signal is true one by determining that the usage allowing signal is one generated with the use of the private key information.

Furthermore, a situation should be taken into account in which a third person who obtains the usage allowing signal itself generated with the use of the private key information by means of an illegal process such as wire-tapping, and, therewith, the third person generates a false usage allowing signal. A configuration should be provided further for such a situation. For this purpose, for example, a configuration is provided such that, when the predetermined device issues the usage request signal, the usage request signal is changed always or each time according to a predetermined rule. That is, information which is changed always or each time according to the predetermined rule is included in the usage request signal sent to the management apparatus. This predetermined rule for changing the usage request signal can be known only between the predetermined device and the predetermined management apparatus, and cannot be known by any third person.

Then, the management apparatus which has received this usage request signal uses the above-mentioned information included in the usage request signal, which information is one changed always or each time according to the predetermined rule as mentioned above, to generate the usage allowing signal, which is then returned to the predetermined device. Then, the predetermined device receiving this usage allowing signal determines whether or not the usage allowing signal is one positively generated with the use of the above-mentioned information changed always or each time, which the predetermined device itself has currently used to generate the usage request signal. This determination is a determination as to whether or not the information changed always or each time, originally included in the usage request signal which the predetermined device itself has produced, is included in the usage allowing signal this time received from the management apparatus. Accordingly, this determination applies the information which only the predetermined device and the predetermined management apparatus can know. As a result, even when a third person uses the usage allowing signal used at a previous time illegally, to produce the false usage allowing signal as mentioned above, the predetermined device which receives the false usage allowing signal can be easily determine that it is the false one. This is because the false usage allowing signal is one produced with the use of the old information changed always or each time which is one used at the previous time as mentioned above, which is different from the current information changed always or each time, which the predetermined device itself currently includes in the usage request signal. Thus, the identification of the false usage allowing signal can be easily achieved. As a result, the third person cannot actually start up the predetermined device even when the third person obtains the predetermined device illegally.

Furthermore, another case is discussed now, in which, before the predetermined device is obtained by the third person illegally and thus the true owner at this time uses the predetermined device, the third person illegally obtains, by means of wire tapping or such, the usage request signal transmitted from the predetermined device, for the purpose of applying the thus-obtained information after illegally obtaining the predetermined device. That is, the third person intends to apply the thus-illegally-obtained usage request signal for transmitting to the management apparatus and obtaining therefrom the usage allowing signal, which the third person intends to use to start up the predetermined device after illegally obtaining the predetermined device. In this case, however, as mentioned above, the contents of the usage request signal are changed always or each time with the use of the information changed always or each time according to the predetermined rule which is not known by the third person. Accordingly, even when the third person transmits the usage request signal to the management apparatus as mentioned above before the usage preventing instruction issued by the true owner reaches the management apparatus, the management apparatus can easily determine that the thus-received usage request signal is not one actually transmitted from the predetermined device itself. Further, when the management apparatus erroneously generates and returns the usage allowing signal, and the third person thus received the usage allowing signal illegally intends to apply it to start up the predetermined device after illegally obtaining it, the predetermined device itself can determine, as mentioned above, that the thus-applied usage allowing signal is not one properly produced based on the usage request signal which the predetermined device itself has generated currently. As a result, usage of the predetermined device cannot be allowed actually.

It is noted that the above-mentioned predetermined rule for always or each time changing the usage request signal generated by the predetermined device is, for example, the change is caused according to regular clock timing, the change is caused each time the usage request signal is generated, or such.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENT

Figure 1:
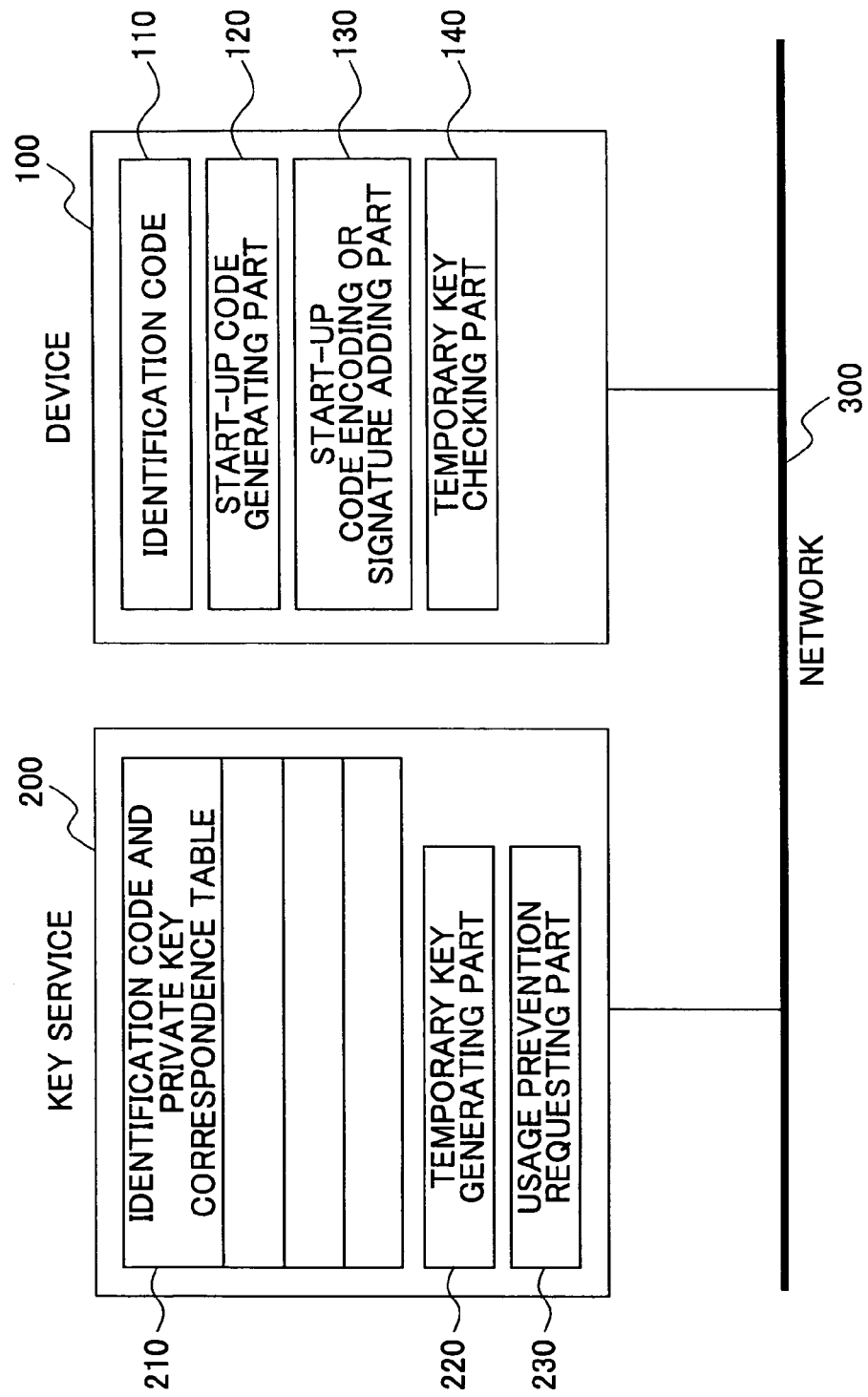
FIG. 1 shows a general functional block diagram of an information processing system according to one embodiment of the present invention.

An embodiment of the present invention is described. A basic concept thereof is described first.

That is, a key service center is provided connected with a communication circuit such as the Internet. Then, when a predetermined device is started up, the predetermined device should make a predetermined confirmation to the key service center every time via the Internet. In response to the confirming operation thus carried out by the predetermined device, the key service center returns a confirmation acknowledgement. For example, predetermined 'key information' is returned. The predetermined device receives this key information. Then, only when the key information is received, starting up of the predetermined device is allowed by a function of the predetermined device.

By applying this configuration, the following advantage is obtained. That is, when a true owner of the predetermined device loses the predetermined device or has the same stolen, the true owner should first request the key service center to prevent usage of the predetermined device. In response thereto, the key service center after that does not return the above-mentioned confirmation acknowledgement even when the above-mentioned confirmation operation, which is carried out every time of starting up of the predetermined, is actually carried out to the key service center. That is, the key service center does not return the predetermined key information in this case even receiving the confirmation operation. As a result, usage of the predetermined device is not allowed, according to the intention of the true owner. Therefore, even when a third person obtains the predetermined device, information of the true owner stored in the predetermined is prevented from leaking to the third person.

The following problem may be assumed even when realizing such a system. That is, if the key service center applied the key information of fixed contents every time, the key information may be illegally obtained by the third person previously, the thus-illegally-obtained key information may be stored there, and then, the third person may be able to pretend the true owner (spoofing), to illegally start up the predetermined device.

In another example, if forging of the above-mentioned confirmation operation, carried out by the predetermined device every time it is started up, can be easily made, the third person may previously send the false confirmation operation (dummy) to the key service center many times, to obtain the above-mentioned key information returned from the key service, and store it. In such a case, the third person may illegally start up the predetermined device with the use of the thus-stored key information.

Further, if authentication is carried out only with the key information upon starting up of the predetermined device, a problem may occur when the true owner delays to request the key service center to prevent usage of the predetermined device when the predetermined device is lost. That is, when such a delay occurs, the third person who has illegally obtained the predetermined device may have already obtain the key information from the key service center and started up the predetermined device with the use thereof when the true owner requests the key service center to prevent usage of the predetermined device. In such a case, the third person may use the predetermined device freely until the predetermined device will be stopped down and then is started up again.

Another problem may be assumed. That is, the communication circuit such as the Internet falls in an inoperative situation by some cause when the predetermined device requests the key information from the key service center, even the true owner cannot obtain the key information and thus, cannot use it.

Furthermore, a case may be assumed in which the above-mentioned predetermined device is a start-up disk required for starting up a drive unit of a computer or such. In such a case, the computer is not in a condition in which the computer can actually access the communication circuit such as the Internet before the computer is not yet sufficiently started up. Accordingly, it is not possible to obtain the key information via the communication circuit, and thus, even the true owner is not allowed to use the computer.

In order to solve these problems, the following configuration is provided in the embodiment of the present invention. That is, according to the embodiment of the present invention, the above-mentioned predetermined device, such as a computer, an information recording disk (a hard disk, a flexible disk, a CD-ROM, or such) or such which is used in a condition of being connected to or loaded in a computer, or the above-mentioned key service center has the following configuration:

1) The predetermined device has a unique ID (identification code).

2) The key service center has a correspondence table of the 'identification code', 'private key' information corresponding thereto and 'true owner' information of a true owner of the predetermined device.

3) Upon starting up of the predetermined device, the predetermined device itself, a computer which is a drive unit driving the predetermined device or such encodes the 'identification code' of the predetermined device itself and a predetermined 'start-up code' together. The thus-obtained encoded data is transmitted to the key service center via the communication circuit.

4) The above-mentioned 'start-up code' has its contents changed every time by means of a function of the predetermined device or the drive unit therefor. As a method of changing the contents of the start-up code every time, the following two methods may be applied for example. The first method is that the start-up code is changed according to regular time information by means of a clock. The second method is that a predetermined non-volatile memory is provided for storing the contents of the previously applied start-up code previously, and then, the contents of the start-up code currently applied are determined based thereon. For example, the start-up code includes a number, and "1" is added each time to obtain a current one.

5) The key service center uses the identification code of the above-mentioned encoded data sent from the predetermined device as a key, to search the above-mentioned correspondence table for the private key information corresponding to the predetermined device. Then, the key service center uses the thus-obtained private key information, to generate data from the start-up code of the above-mentioned received encoded information according to a predetermined method. The thus-generated data is used as 'temporary key' information.

6) The key service center sends or returns the temporary key information to the predetermined device in response to the above-mentioned encoded information.

7) In response thereto, the predetermined device determines whether or not the temporary key information thus received is data actually generated from the 'start-up code' which the predetermined device itself has sent currently with the use of the 'private key' information unique to the predetermined device managed by the key service center. When the determination result is that the above-mentioned temporary key information received is data positively generated from the 'start-up code' which the predetermined device itself has sent currently with the use of the 'private key' information of the predetermined device itself, the predetermined device allows starting up of itself, or allows continuous operation of itself.

8) The key service center is provided with an interface for the true owner to request the key service center to prevent usage of the predetermined device which the true owner originally has. Then, upon receiving the request which indicates prevention of usage of the predetermined device (referred to as a 'usage preventing instruction', hereinafter), the key service center then does not return the temporary key in response to the confirmation operation (referred to as a 'key information request signal' hereinafter) sent from the predetermined device, and merely returns a 'usage prevented state' notification.

The embodiment of the present invention may further include the following configurations preferably:

9) Before the identification code of the predetermined device and the start-up code are transmitted upon starting up of the predetermined device, private key information of the predetermined device itself is applied, and authentication key information is produced based on the identification code and the start-up code with the use of the private key information. The key service center determines whether or not the authentication key information thus transmitted from the predetermined device is one actually produced with the use of the above-mentioned private key information.

The private key information thus applied by the predetermined device itself may be or may not be the same as that applied by the key service center for producing the temporary key information.

10) The key service center has a function of, upon receiving the start-up code or the identification code, determining a transmission source (an address or such) from this code or such, and returning a signal requesting a password for the purpose of user authentication only when the thus-obtained transmission source is not included in previously registered transmission sources.

11) The predetermined device has a function of requesting the temporary key information from the key service center, not only at a time of starting up, but also at every predetermined interval. Then, the predetermined device continues operation only when the proper temporary key information is returned from the key service center in response to the request. On the other hand, the predetermined device stops the operation when the proper temporary key information is not returned.

12) As source data applied for producing the above-mentioned temporary key information in the key service center, predetermined desired 'valid period' information is included in addition to the above-mentioned start-up code. Thereby, usage of the predetermined device is allowed, that is, starting up operation is allowed, or already started operation is further continued, even when proper user authentication operation with the use of the temporary key information is failed due to a reason that the predetermined device is not actually connected to the communication network or such, only within the valid period.

13) Further, a configuration is provided such that the above-mentioned desired valid period information applied when the temporary key information is produced is arbitrarily designated by the owner of the predetermined device.

14) A configuration is provided such that, start of activating the above-mentioned proper user authentication operation is intentionally delayed, not only at a time of starting up of the predetermined device, but also until a predetermined access operation for predetermined data, arbitrarily designateable by the user previously, is carried out.

15) In a non-volatile storage area of the predetermined device, information is stored indicating whether or not the above-mentioned 'proper user authentication service with the use of the key information' is activated. Then, at a time of starting up of the predetermined device in an initial setting stage immediately after the predetermined device is purchased, the 'proper user authentication operation with the use of the key information' is not activated. That is, usage or any operation of the predetermined device is allowed unconditionally during this period. Then, after that, the user of the predetermined device may carry out predetermined operation on the predetermined device by which the 'proper user authentication service with the use of the key information' is activated. Thereby, the 'proper user authentication operation with the use of the key information' is actually carried out.

16) When the predetermined device is not connected to the communication network, the 'proper user authentication service with the use of the key information' is deactivated.

The above-described functions of the embodiment of the present invention are described in further detail.

First, the scheme of every time or always changing the contents of the key information to be returned to the predetermined device in response to the request therefrom is described.

That is, the predetermined device produces a code (the start-up code) different each time when being started up, and the predetermined device sends the same to the key service center together with the identification code of its own. The key service center applies the thus-sent start-up code for searching for the private key information corresponding to the predetermined device, and then, with the use thereof, the key service center produces the temporary key information.

As a specific method for producing the temporary key information, an encoding technology may be applied, for example. That is, the key service center applies the private key information for encoding the start-up code, and then returns the same to the predetermined device. The predetermined device receiving the thus-encoded start-up code decodes the same, and then, determines whether or not the above-mentioned start-up code is positively obtained from the decoding. Thereby, the predetermined device can determine whether or not the returned information is one which has been produced with the use of the private key information which only the key service center has. The encoding technology applicable thereto is described in further detail.

That is, so-called 'public key cryptography' (well-known art) may be preferably applied. The public key cryptography has the following features: That is, a pair of a specific private key and a public key are applied. The public key can be referred to by anybody, while the private key is held only by a specific person. After data is transformed (or encoded) with the use of the public key, the same data can be obtained from inverse transformation (decoding) carried out on the once transformed data, with the use of the corresponding private key. On the other hand, after data is transformed with the use of the private key, the same data can be obtained from inverse translation carried out on the once transformed data, with the use of the corresponding public key.

By applying the pubic key cryptography, a so-called digital signature system can be easily achieved.

That is, (1) Upon creating a digital signature, a signer transforms original data with the use of the signer's private key, to obtain signed data;

(2) Then, the signed data and the original data are sent to another person (only the signed data should be sent when the other person already knows the original data);

(3) The other person receiving the data authenticates the same. For this purpose, the above-mentioned signed data is inverse transformed by this other person with the use of the public key corresponding to the private key, i.e., the public key of the signer. The original data is obtained only thereby.

In this scheme, even when a third person intends to forge the signed data, the third person cannot obtain the same since the third person does not have the private key to apply.

Thus, according to the digital signature scheme with the use of the public key cryptography, when the person who receives the signed data can obtain the original data with the use of the public key of the signer, it is proved that the signed data is that which has been-produced by the specific person who has the private key. Thus, the authentication is achieved.

For applying the public key cryptography to produce the above-mentioned temporary key information in the embodiment of the present invention, the above-mentioned start-up code is regarded as the above-mentioned original data, and a digital signature is produced therefrom. Thus, the temporary key information is obtained. The predetermined device which receives the temporary key information inverse transforms the same with the use of the corresponding public key information and thus decodes the same. Then it is determined whether or not the same start-up code is actually obtained from the decoding. Thus, the predetermined device can prove that the temporary key information which has been surely produced by the key service center has been received.

'Modern Cryptograph', written by Tatsuaki Okamoto and Hiroshi Yamamoto, published by Sangyo Tosho Shuppan Co., Ltd., 1997, Chapter 'Digital Signature', discloses this public key cryptography in further detail, for example.

Next, a specific example of the 'start-up code' generated in the predetermined device is described. In a simplest example of a method of generating the start-up code, a value of the start-up code is incremented by "1" each time of starting up of the predetermined device. In another method, a current time (clock time) is applied as the start-up code, a pseudo-random number sequence is applied, or so.

Further, a specific example of a method of actually making the usage preventing request for preventing usage of the predetermined device, made to the key service center by a true owner is described next. For example, a common method applied when a credit card or such is lost may be applied. That is, a person who lost the predetermined device may call a predetermined organization, and make the request. Then, the predetermined organization calls back this person with a predetermined registered telephone number so as to prove that the person is the true owner. After that, actual usage preventing processing is carried out by the predetermined organization, to control the key service center. Thereby, the temporary key information is no more returned by the key service center in response to a request made from the predetermined device via the communication circuit. Other than this method, as a method of actually making the usage preventing request for the predetermined device, a method may be applied, which is one commonly applied for electronic commerce or such with the use of the Internet or such, in which actual usage preventing processing of preventing generation of the temporary key information from the key service center is achieved after authentication for a person who makes the request, with the use of a common password authentication system, is completed out in success.

Next, two methods of avoiding forging of the key information request signal sent by the predetermined device to the key service center are described. A first method thereof is a method in which the identification code of the predetermined device is made confidential, is encoded, and then, is sent to the key service center. In this configuration, a person who does not know the identification code of the predetermined device cannot forge the key information request signal to be sent to the key service center.

A second method is described. In the second method, the identification code of the predetermined device is not made confidential. However, in addition to the above-mentioned 'identification code' and 'start-up code', a 'digital signature' obtained from encoding the start-up code with the use of a predetermined private key of the predetermined device, is included in the key information request signal sent to the key service center (for which the above-described public key cryptography may be applied). The key service center receiving it decodes the digital signature part of the received information. Then, when the predetermined start-up code is obtained from the decoding, the key service center can prove that the signature has been produced positively with use of the private key which only the predetermined device has.

Next, a configuration for a case where a third person who illegally obtained the predetermined device has made an operation to start up the predetermined device before the true owner who lost the predetermined device makes the usage preventing request to the key service center is described. In this case, the key service center determines a transmission source from which the key information request signal. Then, when it is determined that the transmission source is different from a predetermined registered transmission source, the key service center requests a password from the transmission source. That is, a case is assumed that the predetermined device is an information recording disk (CD or such), and this device is started up in a condition in which it is loaded in a computer acting as a drive unit therefor. In such a case, when the predetermined device (disk) is used by the third person with the use of his or her computer, a MAC address of the computer as the transmission source information is different from that of the computer of the true owner of the predetermined device. Thus, the transmission source of the key information request signal is different from the registered one. In such a case, the key service center requests a password from the transmission source as mentioned above. Since the third person cannot know the proper password, the key service center can determine that the predetermined device is now not held by the true owner.

In such a case, another case should also be further assumed in which the true owner applies another computer to use the predetermined device (CD or such). Such a case may occur when the true owner makes a business trip, and thus, he or she applies a different computer from that he or she regularly uses. In such a case, the true owner knows the password, and thus, the proper password is returned in response to the above-mentioned request made by the key service center. With the use of the thus-obtain proper password, the key service center can carry out password authentication in success accordingly, and thus, the key service center returns the necessary temporary key information. On the other hand, the proper password is not input when the third person intends to use the predetermined device illegally as mentioned above, thus the necessary temporary key information is not returned, and thus, usage of the predetermined device is not allowed accordingly.

Further, it is preferable that the predetermined device should transmit the key information request signal to the key service center, not only at a time of starting up the predetermined device, but also each time a predetermined interval elapse after the starting up, and then, continuation of operation of the predetermined device is allowed only when the proper temporary key information is returned from the key service center at the time. In this case, a configuration should be provided in which the predetermined device automatically stops its operation unless the return of the proper temporary key information has been confirmed. After this automatic stoppage, starting up of the predetermined device again is not allowed until this confirmation is obtained.

Next, a situation is assumed that the communication circuit enters an inoperative state due to some cause, the true owner of the predetermined device thus cannot transmit the key information request signal to the key service center, or cannot receive the temporary key information, and thus, even the true owner cannot use the predetermined device. In order to solve this problem, the above-mentioned 'user authentication function with the use of the key information' may be invalidated appropriately, and thus, the predetermined device can be started up without the need of the authentication with the use of the temporary key information. Alternatively, a conventional password authentication may be applied to allow starting up of the predetermined device in this case.

That is, if the predetermined device cannot be used at all in a case where the communication network is inoperative due to some causes such some trouble, maintenance or such, inconvenience occurs. Therefore, in such a case, if such a situation is forecastable, the key service center returns the temporary key information accompanied by predetermined valid period (for example, one day) information for example in a stage in prior to actual occurrence of the relevant circuit interruption. The predetermined device has a function such that, after receiving the predetermined valid period information, usage of the predetermined device is allowed even when the user authentication with the use of the temporary key information is failed by the reason that access with the communication circuit is not available, during the above-mentioned valid period.

However, when this scheme is applied, a problem may occur if the valid period information included in the temporary key information may be freely rewritten by a third person. That is, if the third person rewrites the valid period information into 'valid for one year' or such, the user authentication function may be substantially taken away. In order to avoid it, a configuration, the same as for the start-up code, should be provided in which the valid period information should be transformed (or encoded) with the use of a predetermined private key, and after that, the thus-obtained data is included in the temporary key information. As a result, the predetermined device can prove that the valid period information received is one which has been positively sent from the key service center.

Furthermore, in a case where the true owner will enter a situation in which he or she cannot actually access the communication circuit for requesting the above-mentioned valid period information, temporarily by a reason that the true owner makes a business trip or such by accident, it is advantageous to apply a scheme in which the key information including the valid period information for the valid period designated by the owner is provided to him or her previously in a condition in which this owner is authenticated with the use of a conventional authentication system with the use of a password or such.

Further, in a case where the predetermined device is a start-up disk, the authentication operation cannot be carried out when a computer acting as a drive unit for the disk is still in a state in which it cannot actually access the communication circuit at a time of initial starting up of the computer. In such a case, the starting up cannot be achieved finally. In order to solve this problem, a storage area of the predetermined device (disk) may be divided into part for which authentication is required, and other part which does not require authentication. In general, such a disk (information recording medium) has a function such that its storage area is divided into unit areas called 'partitions' and is managed in this way. Accordingly, for each partition, control can be carried out as to whether or not authentication is required. Then, basic functions of the OC (operating system) should be located in a partition which does not require authentication. As a result, it is possible to intentionally delay an occurrence of the need of authentication until the system is once started up and the computer enters a state of being able to access the communication circuit. During the delay, the basic functions of the OS and so forth become usable, and after that, the authentication function is actually activated.

Furthermore, it is possible to increase the convenience by the following configuration. That is, information designating whether or not the authentication function is activated is previously written in a non-volatile storage area of the predetermined device. Then, immediately after the predetermined device is purchased, the above-mentioned designation information indicates that no authentication is required, and thus, the predetermined device is freely used. Then only after the predetermined device is actually registered to the above-mentioned authentication service organization, the authentication function is activated.

Thus, according to the embodiment of the present invention, it is possible to effectively reduce a possibility of secret leakage which may occur due to loss of the predetermined device, theft, or such, without losing the convenience of the predetermined device.

Figure 2:
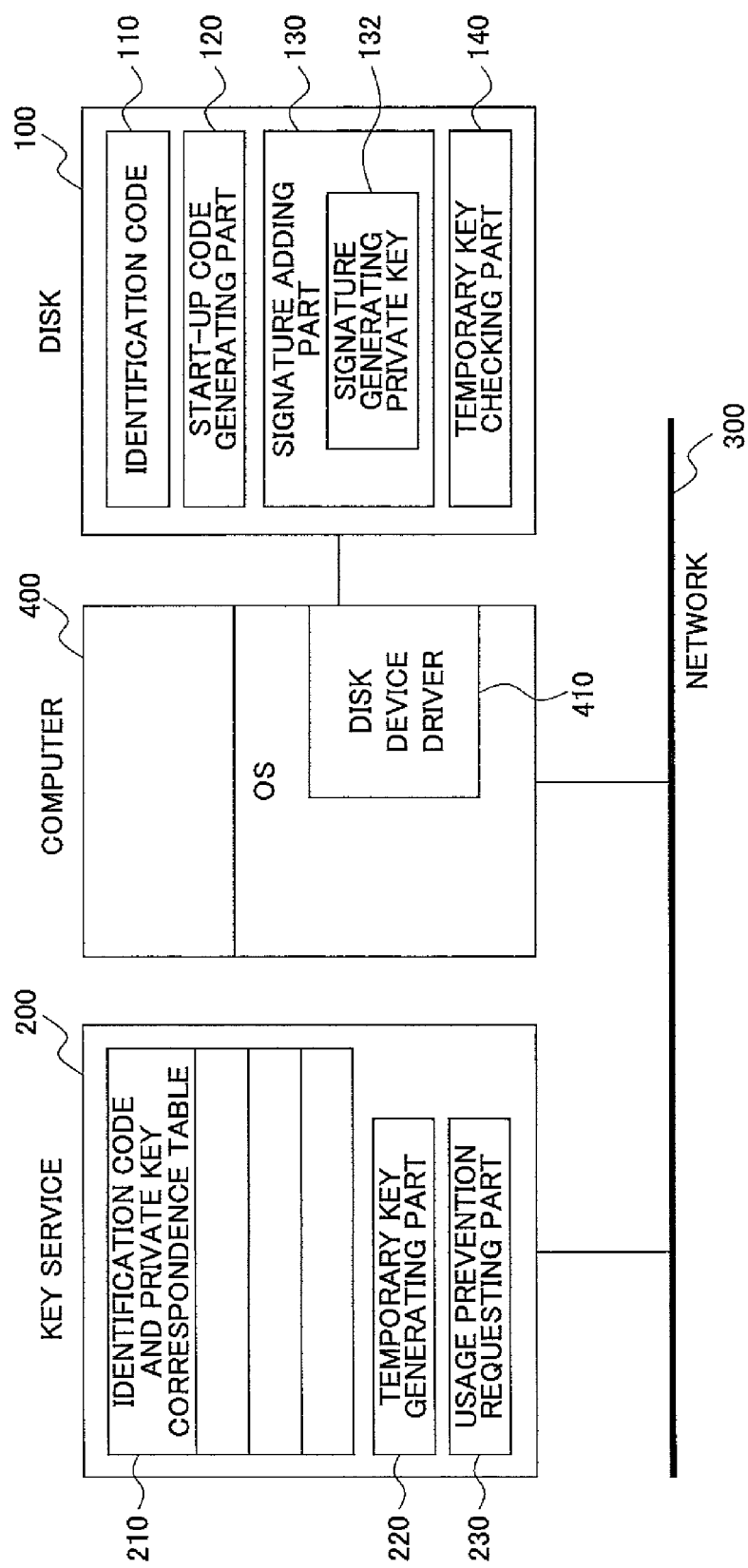
FIG. 2 shows a general fictional block diagram for a case where a predetermined device is an information recording disk in the embodiment shown in FIG. 1.
Figure 3:
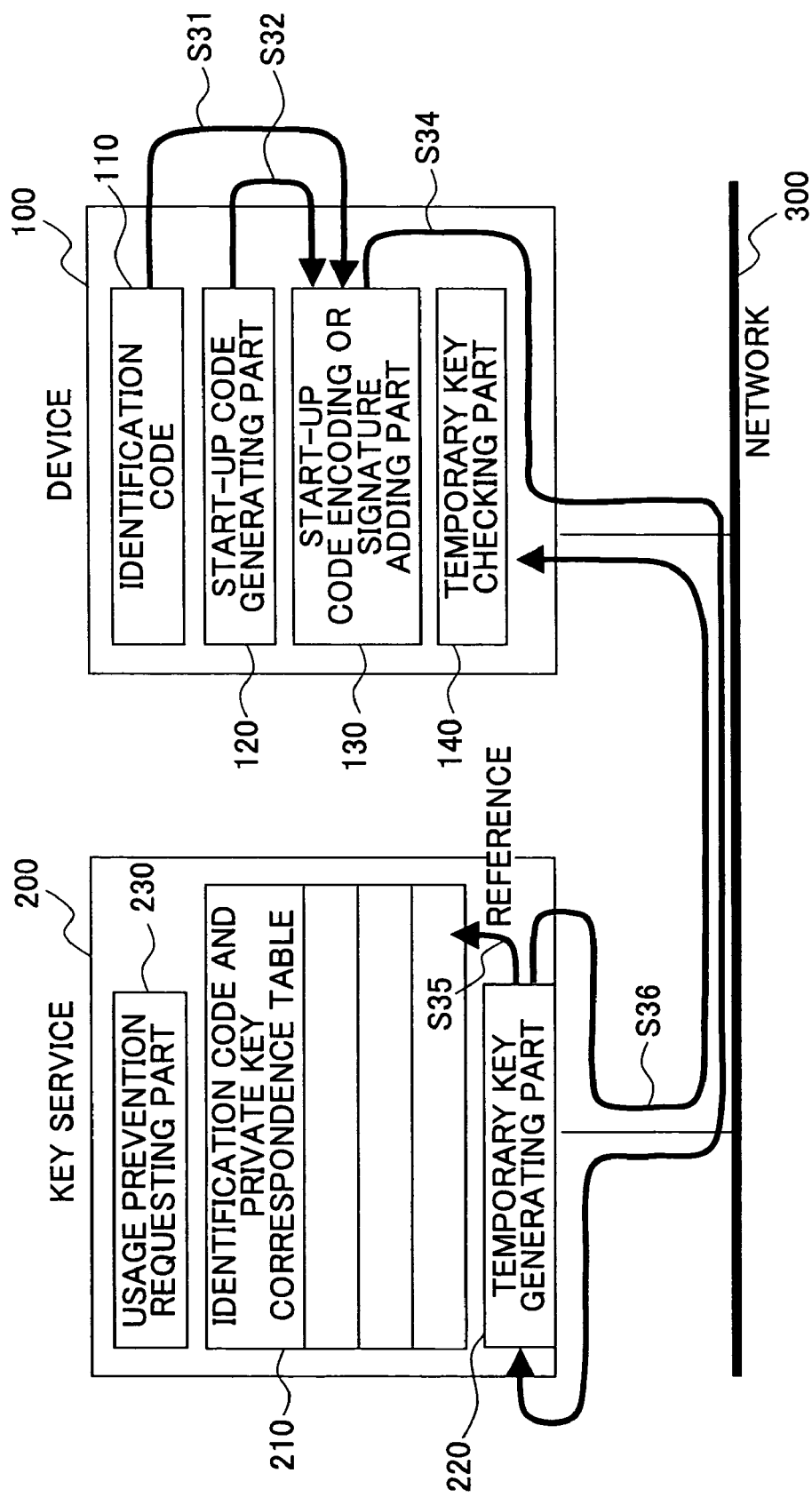
FIG. 3 illustrates a signal flow in the embodiment shown in FIG. 1.
Figure 4:
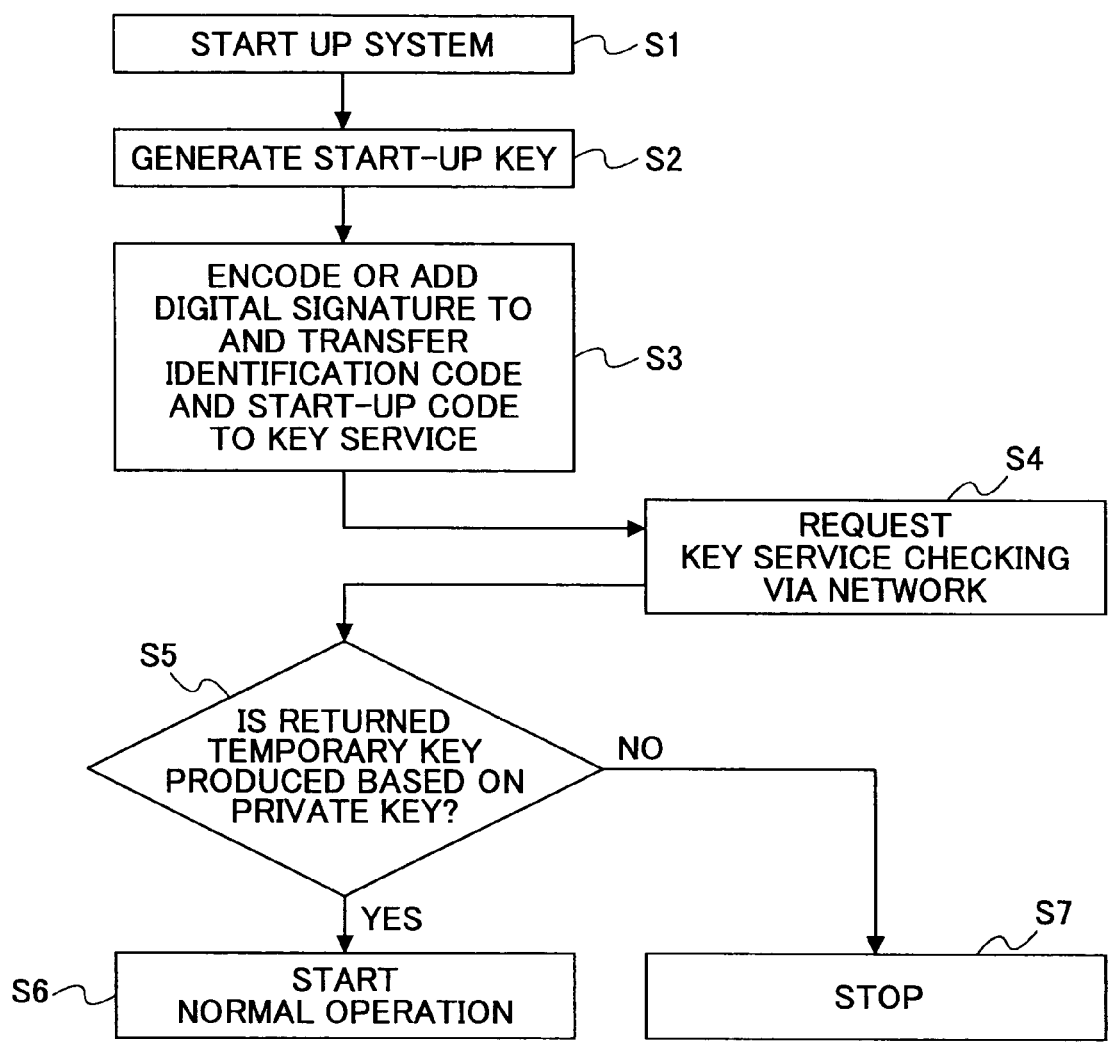
FIG. 4 is an operation flow chart of the predetermined device in the configuration shown in FIG. 1.
Figure 5:
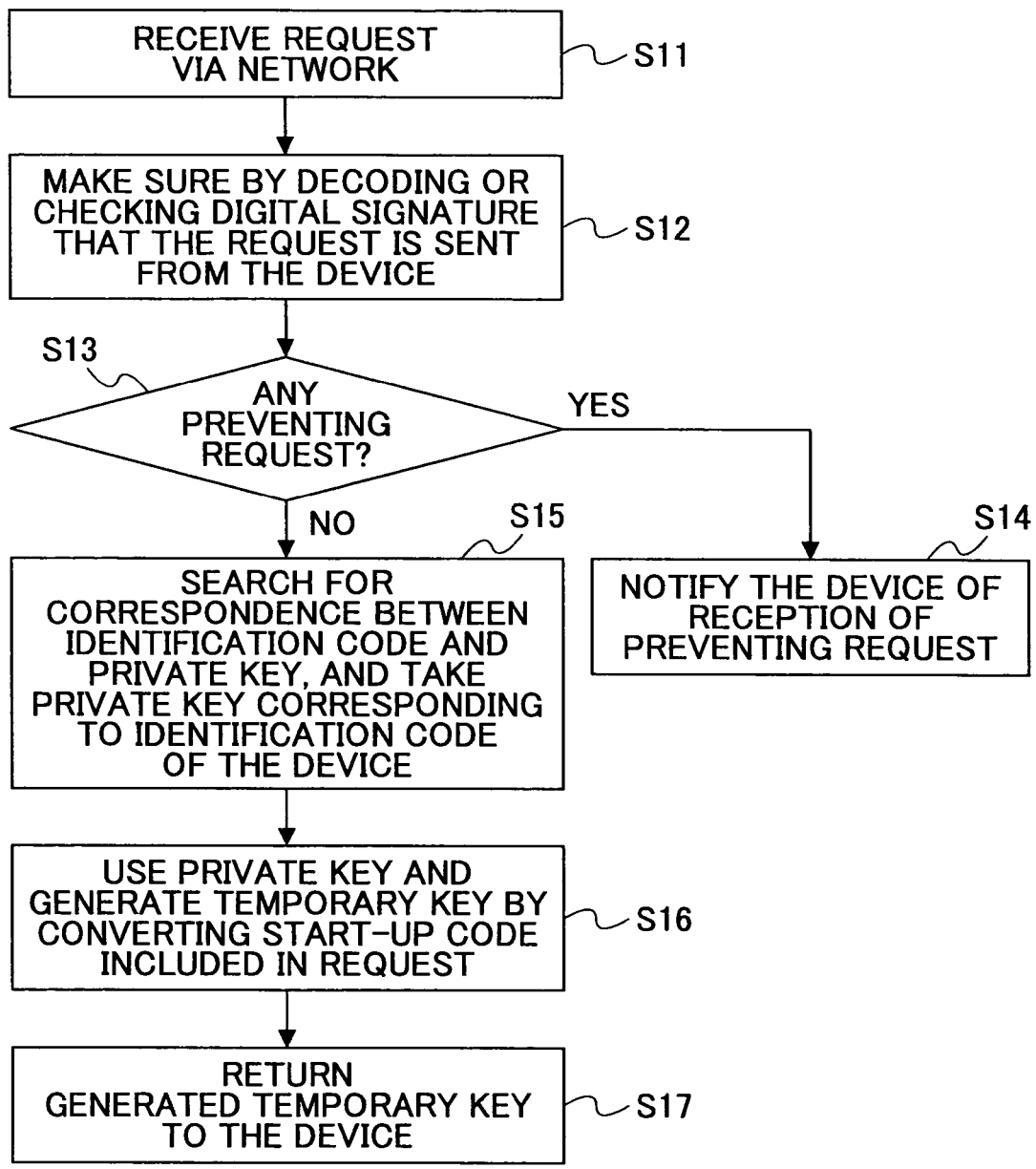
FIG. 5 shows an operation flow chart of a key service center in the configuration shown in FIG. 1.

With reference to figures, a specific configuration of the embodiment of the present invention is described. FIG. 1 shows a principle configuration diagram of the embodiment of the present invention. FIG. 2 shows a block diagram assuming a case where a disk (hard disk, a flexible disk, a CD-ROM, a CD-R, a CD-RW or such) is applied as the predetermined device in the embodiment of the present invention, and is used in a condition of being loaded in a computer. FIG. 3 shows flows of signals in the configuration of FIG. 1 when the above-mentioned authentication operation is carried out. FIG. 4 shows an operation flow chart illustrating operation flow of the predetermined device in the configuration of FIG. 1. FIG. 5 shows an operation flow chart illustrating operation of the key service center.

As shown in FIG. 1, according to the present embodiment, the predetermined device 100 includes the identification code 110 for identifying the predetermined device 100, a start-up code generating part 120 generating the start-up code for requesting the key service center 200 to generate the temporary key information, a start-up code encoding or signature adding part 130 encoding the start-up code or adding a signature thereto, and a temporary key checking part 140.

On the other hand, the key service center 200 which provides the temporary key information for proving that the predetermined device 100 is used by the true owner includes an identification code and private key correspondence table information 210, a temporary key generating part 220 and a usage prevention requesting part 230.

In this configuration, as shown in FIG. 3, when a user will use the predetermined device 100, the predetermined start-up code is produced by a function of the start-up code generating part 120 (Step S2 of FIG. 4), when the user starts up a system of the predetermined device 100 (Step S1). As mentioned above, the start-up code generating part 120 generates the start-up code which has contents different each time. After that, by a function of the start-up code encoding or signature adding part 130, the identification code 110 is read out (Step S31 of FIG. 3). Then, the start-up code generated in Step S2 mentioned above is taken (Step S32). Then, the start-up code encoding or signature adding part 130 encodes the thus-obtained identification code and start-up code, or adds a predetermined digital signature to the code information (identification code and start-up code). After that, the thus-obtained information is transferred to the key service center 200 via the communication network 300 (Steps S3 and S4 of FIG. 4; Step S34 of FIG. 3).

In the key service center 200 receiving the code information encoded or having the digital signature added thereto (Step S11 of FIG. 5), the temporary key generating part 220 decodes the thus-received information, or checks the digital signature attached thereto, and thus, determines whether or not the predetermined device 100 itself, corresponding to the identification code 110 included therein, has positively transmitted this code information as the key information request signal (Step S12). The above-described public key cryptography may be applied to this authentication operation.

When the result of this authentication operation indicates that the relevant code information corresponds to the proper key information request signal, the temporary key generating part 220 searches the identification code and private key correspondence table 230 with the use of the identification code included in the received code information. Then, the private key information is obtained from the search, that is, the private key information for the predetermined device 100 is obtained (Step S15 of FIG. 4; Step S35 of FIG. 3). The temporary key generating part 220 uses the thus-obtained private key information of the predetermined device 100, to transform the start-up code included in the code information received from the predetermined device 100 (that is, encoding according to the above-mentioned public key cryptography or such). Thus, the temporary key information is obtained (Step S16). This temporary key information is then returned to the predetermined device 100 (Step S17; Step S36).

The predetermined device 100 thus obtaining the temporary key information interprets the same in the temporary key checking part 140, and determines whether or not the temporary key information is proper one (Step s4 of FIG. 4). This determination is such that, as mentioned above, this encoded information received now is decoded with the use of its own public key information. Then, when the relevant information can be properly decoded in this manner, determination can be made that the relevant information is positively one, encoded with the use of its own private key information. That is, the predetermined device 100 can confirm that the relevant information is one which has been positively sent from the key service center 200 to which its own private key information was given. Next, the predetermined device 100 determines whether or not the thus-interpreted information is positively one generated based on the start-up code currently transmitted by itself in Step S3. When it can be determined that the relevant information was generated based on the start-up code currently transmitted by itself, the predetermined device 100 normally starts up or continues operation (Step S6).

On the other hand, when such a confirmation is not obtained, that is, when the above-mentioned notification that the usage preventing request is received is made from the key service center 200 in Step S14, when it cannot be determined that the received information is the proper temporary key information (No in Step S5), or when no response has been made from the key service center 200 for a predetermined interval after the code information was transmitted thereto (Step S4), the predetermined device 100 stops its operation (Step S7). As a result, the current user cannot use the predetermined device 100, and thus, cannot read out information stored in the predetermined device 100.

In the actual system of the present embodiment as shown in FIG. 2, communications from the predetermined device 100 to the key service center 200 are realized by a function of a device driver 410 of a computer 400 acting as the drive unit for the disk 100 acting as the predetermined device 100. That is, this disk driver 410 reads, from the disk 100, the start-up code encoding or signature adding part 130 in a form of a program, and executes the same. As a result, a request instruction is issued to the OS, and thus, the communications to the key service center 200 is carried out by means of the function of the OS of the computer 400, with the use of a function of a modem or such not shown. Further, in the disk 100, the identification code 110 unique to the predetermined device 100, and also, a program acting as the temporary key checking part 140, also executed by the device driver 410 and used to prove the propriety of the temporary key information returned from the key service center 200, are stored.

Further, the start-up code encoding or signature adding part 130 has the private key information 132 used for the signature generation, encodes the start-up code and the identification code with the use thereof, and then transmits the same to the key service centre 200.

The key service center 200 is, for example, a common computer having a server function.

Thus, according to the present invention, it is possible to provide, with a relatively simple configuration, functions by which a secret is prevented from leaking out even when a true owner loses an information recording disk or such in which confidential information is stored. Further, even upon applying such a security system, user authentication operation which is required regularly should not be made much complicated, and thus, it is possible to prevent the convenience which the predetermined device inherently has from being degraded due to the thus-applied authentication operation.

In the above-described embodiment, the predetermined device for which user authentication is carried out when it is actually used is an information recording disk. However, it is not necessary to limit thereto. Other than this example, various types of memory cards, various types of information storage devices or such may be applied as the predetermined device of the present invention.

Further, the present invention is not limited to the above-described embodiment, and variations and modifications may be made without departing from the basic concept of the present invention claimed below.

What is claimed is:

1. An information processing system comprising:
    an information recording medium encoded with a program containing a determining part and a usage request signal generating part executable by a computer, the determining part, when executed by the computer, determining whether a usage allowing signal is true or false, and the usage request signal generating part, when executed by the computer, generating a usage request signal that is unique to the information recording medium;
    the computer configured to execute the determining part and the usage request signal generating part of the program of the information recording medium; and
    a management apparatus that includes:
        a transmission preventing processing part configured to prevent transmission of the usage allowing signal that allows usage of the information recording medium, in response to receiving a usage preventing instruction for the information recording medium; and
        a usage allowing signal generating processing part configured to generate the usage allowing signal that is unique to the information recording medium in response to receiving the usage request signal,
    wherein a storage area of the information recording medium is divided into a first divided storage area for which usage is prevented and is allowed by the usage allowing signal and a second divided storage area for which usage is not prevented,
    wherein the computer is further configured to deactivate preventing usage of the information recording medium when the computer is not connected to a communication network.

2. The information processing system as claimed in claim 1, wherein:
the program of the information recording medium further contains a change function part encoded therein which, when executed by the computer, changes the usage request signal generated by the usage request generating part every time according to a rule; and
the management apparatus is configured to previously recognize the rule.

3. The information processing system as claimed in claim 1, wherein:
the usage request signal generating part generates the usage request signal at predetermined timing, and continues operation when receiving a true usage allowing signal that is generated in response to the usage request signal.

4. The information processing system as claimed in claim 1, wherein:
the management apparatus is configured to transmit, in response to receiving desired valid period information together with the usage request signal, the usage allowing signal, with which usage of the information recording medium is allowed during a desired valid period indicated by the desired valid period information.

5. The information processing system as claimed in claim 4, wherein:
the desired valid period is arbitrarily designated by a user of the information recording medium.

6. The information processing system as claimed in claim 1, wherein:
the program of the information recording medium further contains a deactivating part which, when executed by the computer, deactivates preventing usage of the information recording medium, and prevents usage of the information recording medium due to absence of the usage allowing signal after a setting is made by a user of the information recording medium to activate preventing usage of the information recording medium.

* * * * *